(12) United States Patent
Sheinbein

(10) Patent No.: US 6,999,575 B1
(45) Date of Patent: Feb. 14, 2006

(54) METHOD FOR PROVIDING A PREFERENTIAL ROUTING AND BILLING ARRANGEMENT FOR A CALL PLACED BETWEEN A CALLING PARTY AND A CALLED PARTY

(75) Inventor: Daniel Sheinbein, Elizabeth, NJ (US)

(73) Assignee: AT&T Corp., New York, NY (US)

( * ) Notice: Subject to any disclaimer, the term of this patent is extended or adjusted under 35 U.S.C. 154(b) by 309 days.

(21) Appl. No.: 10/293,107

(22) Filed: Nov. 13, 2002

(51) Int. Cl.
*H04M 7/00* (2006.01)

(52) U.S. Cl. .......................... 379/220.01; 379/114.01; 379/114.27; 379/221.14

(58) Field of Classification Search ........... 379/114.01, 379/114.27, 219, 220.01, 221.13, 221.14
See application file for complete search history.

(56) References Cited

U.S. PATENT DOCUMENTS 5,867,570 A * 2/1999 Bargout et al. ........ 379/221.13
6,128,377 A * 10/2000 Sonnenberg ........... 379/221.13
6,327,349 B1 * 12/2001 Rollins .................. 379/114.27
6,678,265 B1 * 1/2004 Kung et al. ................. 370/352

* cited by examiner

*Primary Examiner*—Bing Q. Bui
(74) *Attorney, Agent, or Firm*—Michael Haynes PLC

(57) ABSTRACT

The present invention is directed to a method of routing a long distance call from a calling party to a called party over a communication network. The call is received at a local switch located in the first geographic region and operated by a service provider that provides telecommunications services to the called party. The dialed number associated with the received call is recognized as being a special number. The special number is formatted as a local number with respect to a calling party's telephone line. A query is sent to a database for routing instructions. A routable number corresponding to the called party's telephone line is received. The called party's telephone line is located in the second geographic region. The call is routed to called party's telephone line over a communication network operated by the service provider. A billing record is created for the call in which an indicator is provided that indicates that the call should be billed at a special call billing rate to the calling or called party.

18 Claims, 2 Drawing Sheets

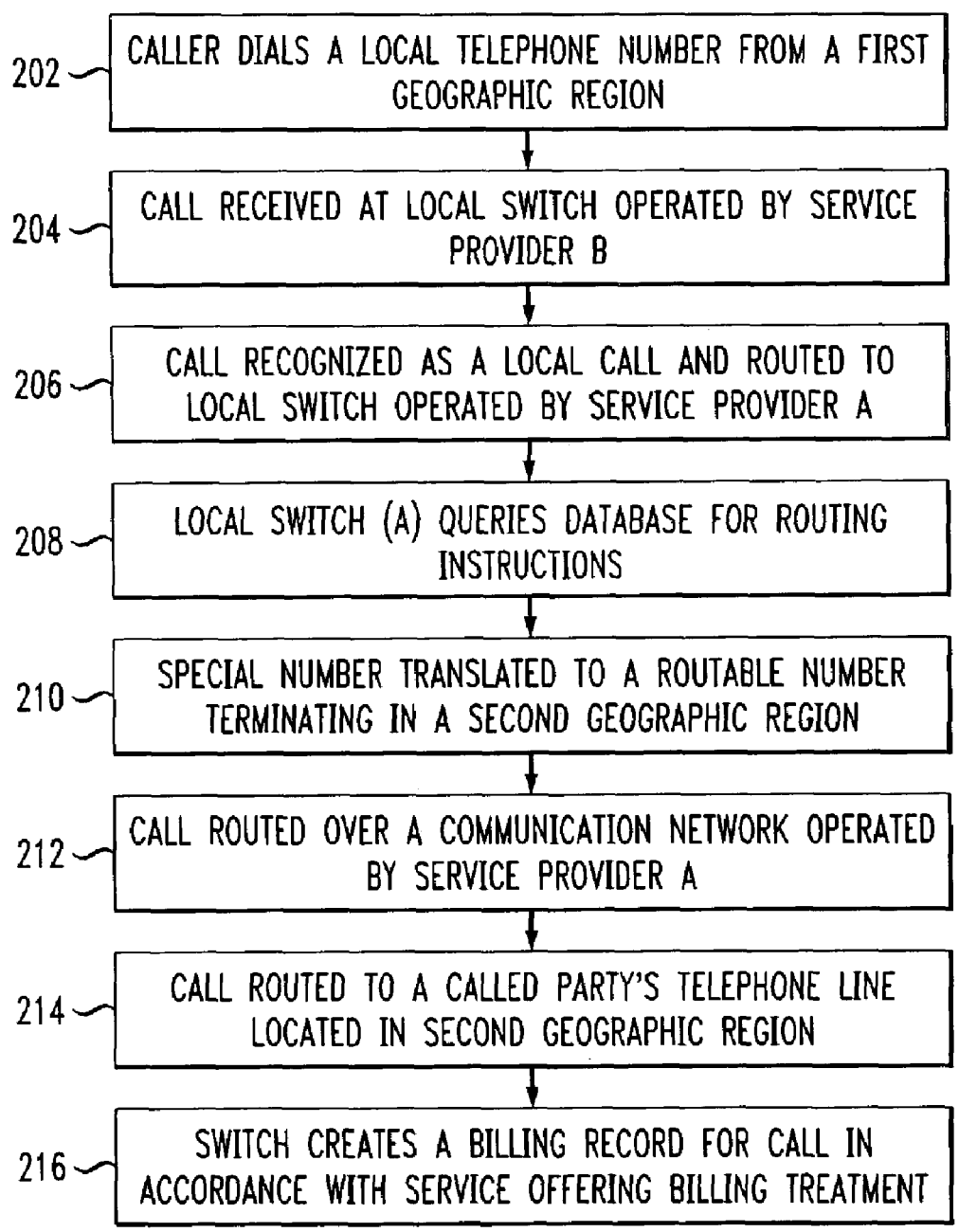

METHOD FOR PROVIDING A PREFERENTIAL ROUTING AND BILLING ARRANGEMENT FOR A CALL PLACED BETWEEN A CALLING PARTY AND A CALLED PARTY

FIELD OF THE INVENTION

The present invention is directed to a method for providing a preferential calling arrangement for a call placed between a calling party and a called party, and more particularly, to a method for providing a routing and billing arrangement in which calls placed to one or more identified telephone lines are provided at a preferential billing rate.

BACKGROUND OF THE INVENTION

In the current telecommunications environment, it is not uncommon for a call to be routed over multiple telecommunication service provider networks. Because of regulatory mandates regarding telecommunication services, there is a distinction between so-called local telecommunication services and long distance telecommunication services. As such, a call carried from one region of the country (e.g., New York City) to another region of the country (e.g., San Francisco) is currently typically routed over two distinct local telecommunication carriers' networks (e.g., Verizon Communications Inc. and SBC Communications, Inc.) and a long distance telecommunication carrier's network (e.g., AT&T Corp.).

Local service has traditionally been provided primarily by a Regional Bell Operating Company (RBOC). As indicated by the name, these companies typically operate in a particular geographical region of the country and provide telecommunication services in that area. In particular, the RBOCs typically operate the central offices and switches that connect directly to the end user (e.g., the lines to the telephone of the calling and called parties).

Long distance telecommunication operators (e.g., AT&T Corp., Sprint Corp., etc.) provide the switches that carry a call from one RBOC to another. Typically the calls are carried over a particular long distance communication network based on a caller's subscription to a particular long distance carrier or selection of a carrier for a particular call (e.g., prepaid cards or calling cards).

Because calls tend to travel over multiple carriers' communication networks in order to reach a particular destination, billing treatment becomes very complicated. From a caller's perspective, calls that remain in an RBOC's network are billed by the RBOC. Calls that are routed over a long distance carrier's network are billed by the long distance carrier. However, a carrier that must use another carrier's network for partial routing of a call typically must pay access charges to that carrier. These charges can significantly add to the long distance billing carrier's cost for routing the call.

While many telecommunication carriers strive to have a fully comprehensive end-to-end network, such realizations are not usually feasible due to the necessary cost and infrastructure requirements. Such costs inhibit a service provider's ability to provide preferential billing arrangements. There is a need for a calling solution in which a single carrier can carry calls through multiple geographic regions and provide preferential billing rates for those calls.

SUMMARY OF THE INVENTION

The present invention is directed to a method of routing a long distance or toll call from a calling party to a called party over a communication network. The called party provides the calling party with a local number to call. This dialed number is in fact not the final destination of the call, but is used for routing and billing purposes. The dialed number associated with the received call is recognized and routed by the local switch to another second local switch in the local calling area. The call is received at the second local switch located in the first geographic region (which is the same geographic region in which the calling party's telephone line is located) and operated by a service provider that provides telecommunications services to the called party. A query is sent by the second switch to a database for routing instructions. The response contains the actual called party's telephone line. The called party's telephone line is located in a second geographic region. The call is routed to called party's telephone line over a communication network operated by the long distance service provider. A billing record is created for the call in which an indicator is provided that indicates that the call should be billed at a special call billing rate to the calling or called party.

BRIEF DESCRIPTION OF THE DRAWINGS

The present invention is illustrated by way of example and not limitation in the accompanying figures in which like reference numerals indicate similar elements and in which:

FIG. 2 is a flow chart that depicts the steps for routing a call in accordance with the method of the present invention.

DETAILED DESCRIPTION

Figure 1:
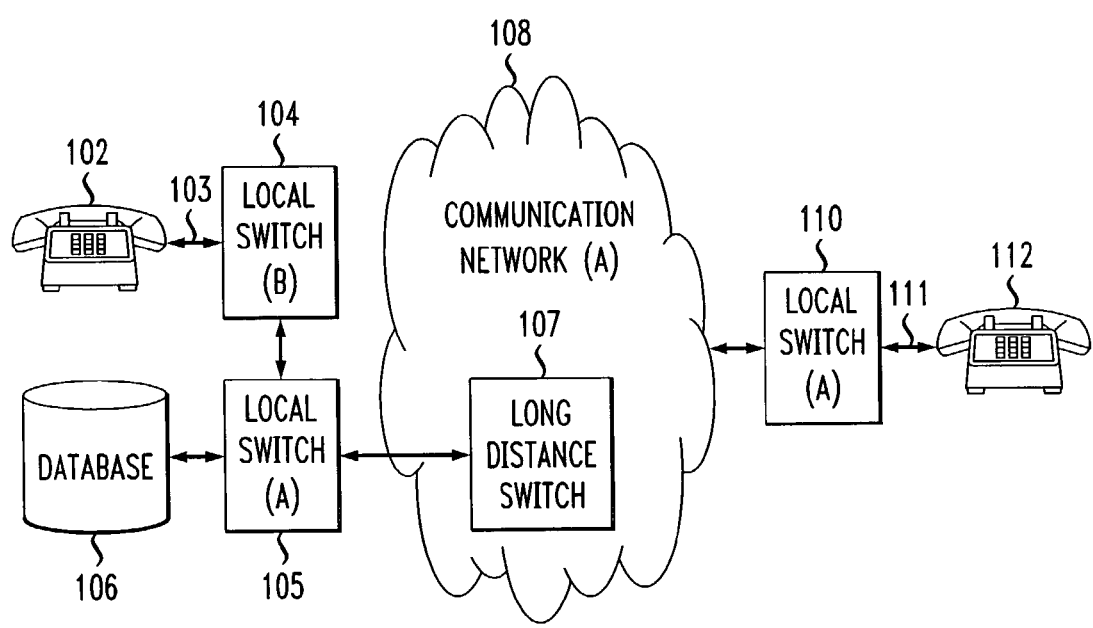
FIG. 1 is a block diagram of a network architecture that implements the present invention.

The present invention is directed to a method of routing a call over a communication network operated by a single communication carrier and applying preferential routing and billing treatment to the call. FIG. 1 illustrates an exemplary network architecture in which the method of the present invention can be realized. The called party provides the calling party with a local pseudo or special number for dialing—but the final destination for the call is called party's communication device 112 that is connected to a telephone line 111 located in another state or geographic region. A calling party places a telephone call using the special local number from communication device 102 located in a first state or geographic region to a calling party's communication device 112 that is located in a second geographic region. The calling party's communication device 102 may be a landline telephone, cellular telephone, or a personal computer that includes telephony software. The called party's communication device 112 is preferably a landline telephone but can be another type of telecommunications device.

The special number dialed by the calling party is a local number. In accordance with the present invention, the local number is a 7 or 10-digit number that would be recognized by a local switch 104 associated with the calling party's telephone 102 as a local call. A local call is a call that is associated with a telephone line in an area that is in a local service area relative to the telephone line of the calling party. For example, if the calling party's telephone is located in New Jersey and has line number 908-234-7656, the special local number could be 908-234-5555. However, in accordance with the present invention, there is no physical line that exists that corresponds to the special local number (i.e., there is no telephone line corresponding to 908-234-5555).

The local switch 104 associated with the calling party's telephone line 103 receives the call. The local switch 104 can be operated by the service provider offering the service of the present invention or a different service provider (for purposes of the present example, service provider (B)). Service provider B in this example is a regional carrier.

Because the dialed special number is in the format of a local number, the local switch 104 is instructed to route the call to another local switch 105. Local switch 105 is operated by service provider (A) which is the carrier providing the service corresponding to the present invention. In some instances, local switch 105 may receive the call directly from the calling party's telephone line 103. Local switch 105 recognizes that the dialed number is a special number (i.e., that there is no physical line corresponding to the special number) and sends a query to database 106 to request that the number be translated to the actual destination number. It is to be understood by those skilled in the art that the database may be an adjunct to local switch 105 or directly incorporated in local switch 105.

The database 106 includes one or more tables that map pseudo numbers to routable destination numbers. In the present invention, the routable destination number corresponds to a long distance number (i.e., a call outside of the calling party's local service area). For example, the routable destination number could be for a telephone line in Illinois having the number 312-777-1212.

The database 106 also recognizes that the dialed number corresponds to a special service offering by service provider A and that special billing treatment is to be applied to the call. The local switch 105, upon receipt of such information from the database 106 might include a flag or other indicator in the billing record created for the call to indicate that the call should receive special billing treatment. A network billing system or an adjunct billing system that processes bills at a later time may apply such treatment. The types of billing treatments that may be applied are described in further detail hereinafter.

Once the call is recognized as a long distance call, the call is routed to a long distance switch 107 that is part of service provider A's communication network 108. Long distance switch 107 also makes a billing record for the call. The communication network 108 then routes the call to a local switch 110 and called party's telephone number 112 that is also operated or leased by service provider A. By routing the call entirely on service provider A's network, no access charges are applied to the call. Local switch 110 sends the call to the called party's telephone 112.

In accordance with the present invention, it is envisioned that a service offering would allow a calling party to place calls to a telephone number that would typically treated as a long distance call, but receive different billing treatment for the call, for example as if the call were a local call. The calling party would be provided with a special number that is formatted like a local number for that calling party's line. Other service providers would recognize the number as a local number even though there is no physical line that corresponds to the special number. Calls placed to the special number would be routed to a local switch operated by the service provider that provides the service. The call would then be routed over that service provider's network and the call would be accorded special billing treatment.

Such a service could be useful in a number of circumstances. For example, a family that has a college-aged child in a college located in a different geographic region or state would benefit from the present invention. Likewise, any family situation in which one or more family members are located in a different region could use the present invention. Furthermore, a person whose work frequently takes him or her to a particular region of the country that is remote from his or her home could use such a service.

The subsequent service could be offered by providing a calling party with a pre-selected choice of one or more telephone numbers that correspond to telephone lines located in a particular geographic region for which to receive preferred billing treatment. One example of the present invention is to treat calls to the selected numbers for billing purposes as if the calls are local calls.

FIG. 2 is a flow chart that depicts the steps for implementing the present invention. A caller dials a local number from his telephone that is located in a first geographic region (step 202). Using the above example, the caller is located in New Jersey whose originating number is (908) 234-7766 and the dialed number is (908) 234-5555. The call is received by a local switch that is operated by service provider B (local switch B) (step 204). Local switch B recognizes the call as a local call and that a local switch operated by service provider A should handle the call. Local switch B routes the call to local switch A (step 206). It is to be understood by those skilled in the art that the local switch that receives the call could be one that is operated by service provider A. In such a case, step 206 would not be necessary.

Local switch A sends a query to a database for routing instructions (step 208). The database identifies the dialed number to be a special number and looks the number up in a table. The special number is translated to a final destination routable number that terminates in a second geographic region (step 210). For example, the routable number may correspond to a telephone line located in Illinois at (312) 777-1212. The database may also recognize that the number corresponds to a service subscribed to by the calling party. The call is routed over a communication network operated by service provider A (step 212). It is to be understood by those skilled in the art that service provider A is the entity providing the service to the calling party.

The communication network routes the call to a local switch that is operated or leased by service provider A and associated with the called party's telephone line. The call is then routed to the called party's telephone which is located in the second geographic region (step 214). The call is recognized by service provider A to be part of a special service offering. As such, a billing record is created for the call in accordance with a particular billing treatment (step 216). For example the service offering could bill the call as a local call. In an alternative embodiment, the call could be subject to a flat fee rate. It is to be understood by those skilled in the art that the billing treatment of the call is arbitrary provided that the calling party deems the billing treatment to be preferential to conventional long distance toll call billing treatment.

While the present invention has been described, in connection with the illustrated embodiments, it will be appreciated and understood that modifications may be made without departing from the true spirit and scope of the invention. It is to be understood that the particular embodiments shown and described by way of illustration are in no way intended to be considered limiting. Therefore, references to details of particular embodiments are not intended to limit the scope of the claims, which in themselves recite only those features regarded as essential to the invention.

I claim:

1. A method of routing a call from a calling party to a called party over a communication network comprising the steps of:

receiving the call at a switch located in a network associated with a first area code of the calling party, the switch operated by a service provider that provides telecommunications services to the called party, the service provider not operating equipment directly connected to a line of the calling party, the received call resulting from the calling party dialing a number within the first area code;

recognizing that the dialed number associated with the received call is a special number;

sending a query to a database for routing instructions;

receiving a routable number associated with the called party's telephone line, the routable number comprising a second area code, the second area code associated with said called party's telephone line and not associated with a local service area of the calling party;

routing the call to called party's telephone line over a communication network operated by the service provider; and creating a billing record for the call in which an indicator is provided that indicates that the call should be billed at a special billing rate to the calling or called party.

2. The method of claim 1 wherein said dialed number by the calling party is a 10-digit number.

3. The method of claim 2 wherein said dialed number by the calling party is formatted as a local number terminating in the first area code.

4. The method of claim 3 wherein the call is billed as a local call to the calling party.

5. The method of claim 1 wherein said dialed number by the calling party is a 7-digit number.

6. The method of claim 1 wherein said special billing rate is a flat fee rate.

7. The method of claim 1 wherein the database is an adjunct to the local switch.

8. The method of claim 1 wherein said database is integrated into said local switch.

9. A method of routing a call from a calling party to a called party over a communication network comprising the steps of:

receiving the call at a switch located in a network associated with a first area code of the calling party, the switch operated by a service provider that provides telecommunications services to the called party, the service provider not operating equipment directly connected to a line of the calling party, the received call resulting from the calling party dialing a number within the first area code;

recognizing that the dialed number associated with the received call is a special number, said special number being formatted as a local number that is not associated with a physical line located in the first area code;

sending a query to a database for routing instructions;

receiving a routable number associated with the called party's telephone line, the routable number comprising the second area code, the second area code associated with said called party's telephone line and not associated with a local service area of the calling party;

routing the call to called party's telephone line over a communication network operated by the service provider; and creating a billing record for the call in which an indicator is provided that indicates that the call should be billed at a local call billing rate to the calling or called party.

10. A method comprising:

at a switch operated by a service provider of a called party, receiving a request for a call from a calling party in a first area code, the service provider not operating equipment directly connected to a line of the calling party, the request comprising a dialed number, the dialed number in the first area code;

responsive to the dialed number, placing the call to an undialed number associated with a telephone line of the called party, the undialed number comprising a second area code not associated with a local service area of the calling party; and creating a billing record for the call, the billing record indicating a local call billing rate.

11. The method of claim 10, further comprising utilizing the undialed number, connecting the call to the called party via a communication network operated by the service provider of the called party.

12. The method of claim 10, wherein the dialed number is not associated with a physical line.

13. The method of claim 10, wherein the call is billed at a flat fee rate.

14. The method of claim 10, wherein said obtaining activity utilizes a database.

15. The method of claim 10, wherein said obtaining activity utilizes a database directly incorporated into the switch.

16. The method of claim 10, wherein said obtaining activity utilizes a database not directly incorporated into the switch.

17. The method of claim 10, further comprising:

sending a query to a database for the undialed number.

18. The method of claim 10, further comprising:

recognizing that the dialed number is a special number that is formatted as a local number and not associated with a physical line located in the first area code.

* * * * *